May 22, 1951     E. A. MILLER     2,553,861
GREASE GUN COUPLING CONNECTOR
Filed June 28, 1947
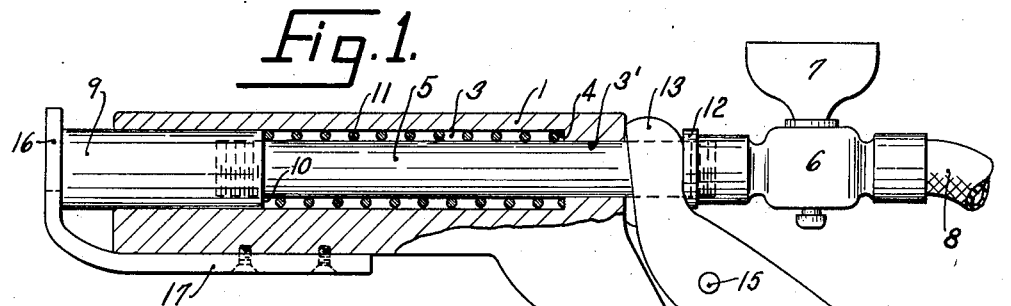
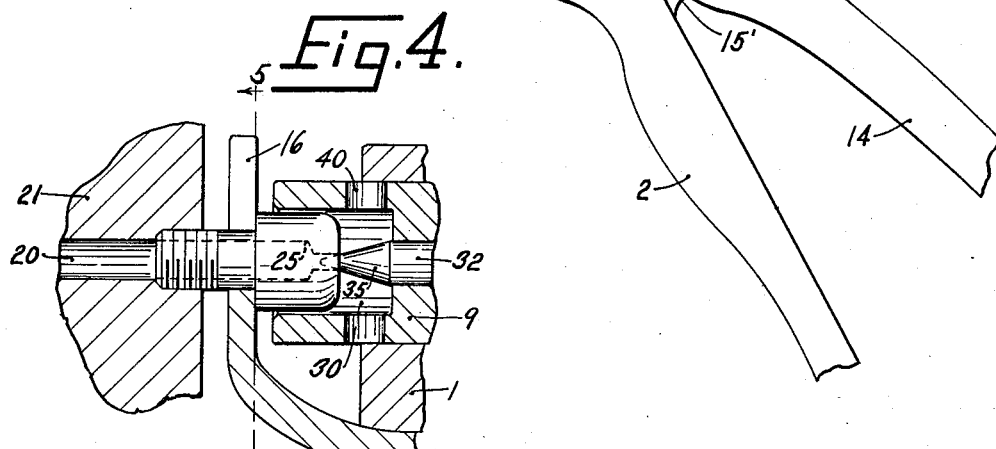
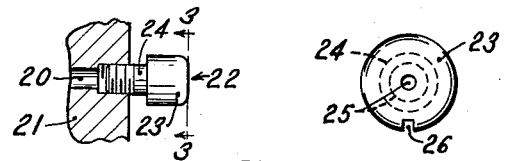 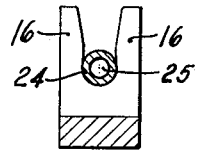
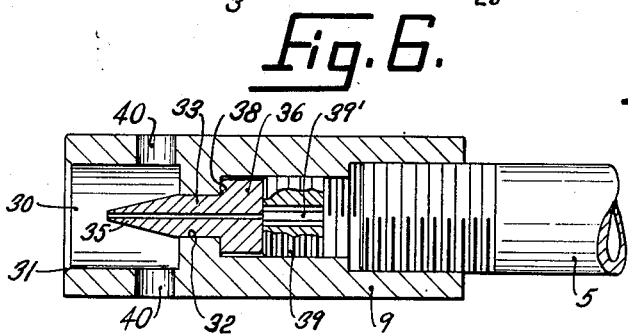 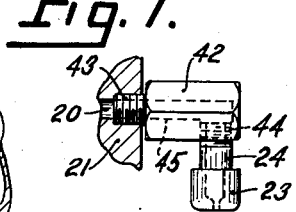
INVENTOR
EMIL A. MILLER
BY Chapin & Neal
ATTORNEYS Patented May 22, 1951

2,553,861

UNITED STATES PATENT OFFICE 2,553,861

GREASE GUN COUPLING CONNECTOR

Emil A. Miller, Palmer, Mass.

Application June 28, 1947, Serial No. 757,833

2 Claims. (Cl. 222—125)

This invention relates to an improved high pressure grease gun coupling connector.

An object of the invention is to provide a simple and reliable coupling connector in which the nozzle of the connector and the opening of the fitting are joined and kept in substantially perfect alignment by the mere attachment of the coupling to the fitting.

Another object of the invention is to provide a coupling connector which will establish this alignment automatically and maintain the aligned connection under several thousand pounds pressure from the source of lubricant supply. A further object is to provide a coupling connection which will require a simple quick manual operation in the attachment and disengagement of the same to the fitting and no further manipulation during application of the lubricant to the passages of the fitting.

How these objects are accomplished by the structure of my invention will best appear from a consideration of the description of the device in connection with the accompanying drawings, in which:

Fig. 1 is a side elevation of the coupling connector with the casing partially cut away for a sectional view of some operative parts;

Fig. 2 is a side view of a grease fitting for use with the connector of Fig. 1;

Fig. 3 is a view on line 3—3 of Fig. 2;

Fig. 4 is a detail view showing the connector and fitting in engaged position;

Fig. 5 is a view on line 5—5 of Fig. 4 on reduced scale;

Fig. 6 is a sectional view showing the coupling connector head structure; and

Fig. 7 is a side view of an adapter for use with the fitting.

The coupling connector (Fig. 1) is in the form of a gun with a barrel casing 1 and integral handle 2. The barrel casing 1 is provided with a longitudinal cylindrical bore 3 shouldered as at 4. Located in the bore and extending rearwardly of the casing 1 through a reduced portion 3' of the bore is a tube 5 the outer end of which is attached to a supply valve 6 with handle 7 on the end of a flexible hose 8 leading from the source of lubricant supply.

At its forward end the tube 5 is internally threaded in a bushing head 9 slidably fitting in bore 3 and providing with tube 5 a shouldered portion 10. Between shoulder 10 and shoulder 4 is a compression spring 11 around tube 5, said spring normally urging said head 9 and tube 5 forwardly in the casing.

At the threaded connection of tube 5 and valve 6 a collar 12 spaced from casing 1 is provided. Between collar 12 and the rear of casing 1 is one end 13 of a bell crank lever 14 pivoted at 15 on an integral bracket 15' of handle 2. By gripping lever 14 and handle 2 in the hand it will be obvious that movement of lever 14 toward handle 2 will result in the rearward movement of tube 5 within casing 1 and against the force of spring 11.

As shown in Fig. 1 the bushing 9 normally extends from the muzzle of barrel casing 1, its outer end pressed by spring 11 against the upturned forked ends 16 (Fig. 5) of a bracket 17 which is suitably attached as by screws to the undersurface of casing 1. It will readily be seen that operation of the bell crank 14 against the force of spring 11 withdraws bushing 9 bringing its outer end flush with the muzzle of casing 1, that is, the opening of bore 3.

The fitting for use in connection with the coupling connector described is shown by Fig. 2. A passage 20 for grease to a bearing or other part to be lubricated is shown in a wall 21. Into the opening of passage 20 is threaded in usual fashion a fitting 22. The fitting is provided with a cylindrical tip 23 and a short reduced portion 24 through which is bored a passage 25 (Fig. 4) connecting with passage 20. The passage 25 may be provided with a tapered seat for a usual ball check valve (not shown). This will be readily understood by those skilled in the art. As shown in Fig. 3 a keyway 26 is cut in the tip 23 for a socket wrench engagement when threading or removing the fitting.

It will be noted in Fig. 6 that the bushing head 9 is provided with an opening 30 flared slightly at its outer edge as at 31 for the reception of the tip 23 of the fitting. At the rear of the opening 30 is a reduced sleeved portion 32 through which a nozzle member 33 projects. As shown the nozzle is tapered to a relatively sharp nose 35 for projecting into the opening of passage 25 of the fitting. The nozzle member 33 is held by a shouldered base 36 resting against an abutment 38 made by the sleeved portion 32. A threaded nut 39 having a bore 39' holds member 33 in position against the abutment.

Having thus far described the structure in detail it will be readily seen from the drawings that the connector may be quickly attached to a fitting by grasping the handle and lever in the hand, operating the bell crank lever to retract the bushing, sliding the forked ends of the bracket 17 on the reduced portion 24 of the fitting, and releasing the lever to permit the bushing to slide over the tip of the fitting. Fig. 4 shows how the nose 35 projects into the opening of the fitting passage 25.

By insertion of the coupling nose 35 into the opening of the fitting, a positive seal is obtained insuring passage of lubricant into the bearing passages. For any dribble of lubricant escaping from nose 35 after disengagement of the coupling connector, ports 40 leading from the interior of opening 30 permit easy drainage. Thus the bushing may be readily kept clean for use.

In the particular application of my device to the lubrication of automobiles and trucks it will be seen that a substantial saving in the time of servicing such vehicles will be had over the present day commercial practice in the use of other forms of connectors.

It is appreciated that on most vehicles some fittings may be more or less inaccessible for use with a device of this character. Consequently, I have shown in Fig. 7 a type of fitting adapter 42 for use with the fitting 22 when a right angle passage to the bearing inlet is desirable. The reduced end 43 is threaded in the wall 21. A threaded opening 44 in the under side of the adapter connecting with a passage 45 is for receiving the end 24 of the fitting described in connection with Fig. 2. Thus the connector is afforded a suitable angle of attachment.

With the coupling connector as described it will be apparent that a ready quick acting attachment to the fitting can be obtained. The flared end of opening 30 permits the sliding of bushing 9 over the tip 23 with an easy motion. Automatically the "sleeved" connection projects the connector nose into the fitting opening upon the simple release of hand pressure on the bell crank.

During the dispensing of grease into the bearing passage no manual control or manipulation of the connector is necessary. The connector is self holding.

Having described my invention, I claim:

1. A grease gun coupling connector comprising a barrel having a bracket at the fore end thereof with forked ends spaced from said end for engagement with a fitting, a tube in said barrel having a cylindrical bushing head with a circular opening at the front end of the head, said head being slidably fitted in the barrel and extendable beyond the fore end thereof to encase a fitting, a spring surrounding said tube with its front end held against the inner end of said bushing, said barrel at its rearward end being inwardly shouldered and holding the other end of the spring, a nozzle member encased in said bushing head and provided with a pointed nose for insertion in a central opening of said fitting, manually actuated means operatively connected to the other end of said barrel to retract said bushing head entirely within said barrel against the urging of said spring, and a fluid passage connecting said nozzle member with a source of supply.

2. A grease gun coupling connector comprising a barrel with an internal longitudinal bore and a handle integral therewith, an internal annular shouldered portion at the rear of said bore, a tube in the bore slidable in said shoulder and extending rearwardly of said barrel for connection to a source of supply, a cylindrical bushing head threaded on the fore end of said tube and presenting a shoulder opposite and equal to said annular shoulder, said bushing having a sliding fit in the fore part of said bore of the barrel and extendable beyond the opening thereof to slide over a fitting, the inner lip edge at the front end of said bushing being flared to facilitate said sliding action, a cylindrical recess inwardly of said flared lip edge, a pointed nozzle member lying with the mouth thereof centrally of said recess, a reduced sleeve portion integral with said bushing forming the inner end of the recess and positioning said nozzle member, said member having a rearward flanged portion seated against the rear shoulder of said sleeve portion, a coil spring surounding said tube in said bore of the barrel between said inner end of the bushing and said shoulder rearwardly of the bore, said spring normally urging said bushing outwardly of the barrel, a bracket on said barrel with forked ends spaced from the front end of said bore of the barrel and forming a stop for the bushing, a collar on said tube spaced from the rear of said barrel, a bell crank lever pivoted to said handle with one end engaged between said barrel end and collar whereby said bushing and nozzle member may be drawn within said bore against the force of said spring by manipulation of said lever and released by the lever for extension of said bushing to slide over a fitting held by said forked ends of the bracket.

EMIL A. MILLER.

REFERENCES CITED

The following references are of record in the file of this patent:

UNITED STATES PATENTS

| Number | Name | Date |
|---|---|---|
| 1,609,425 | Piquerez | Dec. 7, 1926 |
| 1,611,239 | Sanford | Dec. 21, 1926 |
| 1,632,149 | Sanford | June 14, 1927 |
| 1,731,768 | Davis | Oct. 15, 1929 |
| 1,830,480 | Myers | Nov. 3, 1931 |
| 1,871,399 | Adams | Aug. 9, 1932 |
| 1,970,279 | Creveling | Aug. 14, 1934 |
| 1,993,878 | Dodge | Mar. 12, 1935 |
| 2,116,004 | Tear | May 3, 1938 |